(12) United States Patent
Nowakowska et al.

(10) Patent No.: US 12,447,235 B2
(45) Date of Patent: Oct. 21, 2025

(54) HYDROGEL HYBRID MATERIAL, METHOD OF ITS PREPARATION AND APPLICATION

(71) Applicant: UNIWERSYTET JAGIELLONSKI, Cracow (PL)

(72) Inventors: Maria Nowakowska, Cracow (PL); Joanna Lewandowska-Lancucka, Wolbrom (PL); Adriana Gilarska, Lutkow (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 1005 days.

(21) Appl. No.: 17/426,629

(22) PCT Filed: Feb. 21, 2020

(86) PCT No.: PCT/PL2020/050019
§ 371 (c)(1),
(2) Date: Jul. 28, 2021

(87) PCT Pub. No.: WO2020/171723
PCT Pub. Date: Aug. 27, 2020

(65) Prior Publication Data
US 2022/0047776 A1    Feb. 17, 2022

(30) Foreign Application Priority Data
Feb. 21, 2019  (PL) .......................... 428993

(51) Int. Cl.
*A61L 27/44*   (2006.01)
*A61L 27/52*   (2006.01)
*C08L 89/06*   (2006.01)
*C09C 1/30*    (2006.01)
*C09C 3/08*    (2006.01)

(52) U.S. Cl.
CPC .............. *A61L 27/446* (2013.01); *A61L 27/52* (2013.01); *C08L 89/06* (2013.01); *C09C 1/3063* (2013.01); *C09C 3/08* (2013.01); *A61L 2300/802* (2013.01); *A61L 2430/02* (2013.01); *C08L 2203/02* (2013.01); *C08L 2205/03* (2013.01)

(58) Field of Classification Search
CPC ........ A61L 27/446; A61L 27/52; A61L 27/26; C08L 89/06; C08L 5/08
See application file for complete search history.

(56) References Cited

FOREIGN PATENT DOCUMENTS

CN    102188746 B    8/2013

OTHER PUBLICATIONS

Gilarska, Colloids and Surfaces, B, Biointerfaces, 170, 2018 (Year: 2018).*
Filipowska, International Journal of Biological Macromolecules, 113, 2018 (Year: 2018).*
Chen, Applied Surface Science, 255, 2008 (Year: 2008).*
Lewandowska-Łańcucka, International Journal of Biological Macromolecules, 136, 2019 (Year: 2019).*
International Search Report, Int. Application No. PCT/PL2020/050019, mailed Sep. 9, 2020.
Written Opinion of the International Searching Authority, Int. Application No. PCT/PL2020/050019, mailed Sep. 9, 2020.
Gilarska, Adriana, et al., "Collagen/Chitosan/hyaluronic acid—based injectable hydrogels for tissue engineering applications—design, physiochemical and biological characterization," Colloids and Surfaces. B. Biointerfaces, vol. 170, Jun. 4, 2018, pp. 152-162.
Filipowska, Joanna, et al., "In vitro osteogenic potential of collagen/chitosan-based hydrogels-silica particles hybrids in human bone marrow-derived mesenchymal stromal cell cultures," International Journal of Biological Macromolecules, vol. 113, Jul. 1, 2018, pp. 692-700.
Sionkowska, Alina, et al., "Preparation and characterization of composites based on the blends of collagen, chitosan and hyaluronic acid with nano-hydroxyapatite," International Journal of Biological Macromolecules, vol. 102, Apr. 5, 2017, pp. 658-666.
Kang, Kyoung-Ku, et al., "Synthesis of silica nanoparticles using biomimetic mineralization with polyallylamine hydrochloride," Journal of Colloid and Interface Science, vol. 507, Jul. 31, 2017, pp. 145-153.

* cited by examiner

*Primary Examiner* — Susan T Tran
*Assistant Examiner* — William Craigo
(74) *Attorney, Agent, or Firm* — Arrigo, Lee, Guttman & Mouta-Bellum LLP

(57) ABSTRACT

A biocompatible hydrogel hybrid material useful in regenerative medicine, in particular in reconstruction of bone tissue and a method of its preparation is disclosed.

6 Claims, 6 Drawing Sheets

HYDROGEL HYBRID MATERIAL, METHOD OF ITS PREPARATION AND APPLICATION

Figure 1:
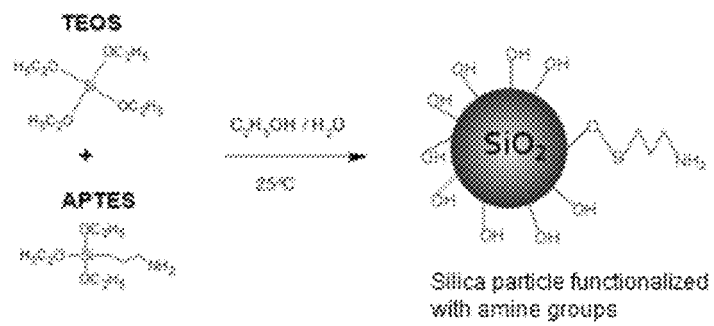

The invention relates to the field of material engineering, and more particularly to structurally stable bioactive injectable hydrogel hybrid materials, applicable for use in tissue engineering.

Fabrication of novel biomaterials designed for tissue engineering purposes and aiming at bone tissue reconstruction, is still a significant challenge for regenerative medicine [1, 2]. Studies aimed at developing and producing of bioactive cell scaffolds are especially important due to the possibilities of utilizing the therapeutic potential of such materials in reconstruction of bone defects caused by accidents, bone diseases as well as alterations in bone tissue caused by aging processes [3]. Injectable biopolymeric hydrogels are extremely promising candidates for scaffold applications due to a variety of distinguishing properties [4, 5].

The aim of the invention is to provide a biopolymeric material that would be particularly suitable for use in regenerative medicine, especially in bone tissue reconstruction. It is particularly desired for the material to ensure acceleration of the mineralization process and to serve as a convenient biomatrix for colonization by osteoblast cells. The object of the invention is a biocompatible hydrogel hybrid material and a method of production thereof, defined in detail in the appended claims. Implementations of the invention demonstrated within the present application is a product in the form of a hydrogel hybrid material, characterized in that that it was obtained by simultaneous cross-linking, with a biocompatible crosslinking agent, which is genipin, of a biopolymeric hydrogel matrix composed of collagen, chitosan and hyaluronic acid and dispersed within silica particles with surfaces intentionally modified with amine groups.

Surface functionalization with amine groups enabled covalent binding of silica particles with hydrogel polymeric network during crosslinking with genipin—an agent capable of crosslinking through formation of covalent bonds with primary amine groups. The obtained bioactive material is a homogenous hybrid material, wherein bioactive silica particles are permanently bound with a biopolymeric matrix. Covalent binding of silica nanoparticles with the matrix eliminates a serious problem which is phase separation of particles and their uncontrolled diffusion to tissues under in vivo conditions, observed in a situation when particles are not immobilized.

The hybrid material according to the invention can be used for reconstruction of orthopedic, dental bone defects. It can be introduced into a defect with a non-invasive method (injection) and gelled in a controllable manner, and after fulfilling its therapeutic function it will be enzymatically degraded (as was shown) with formation of biocompatible products.

Surprisingly, the material according to the invention provides acceleration of mineralization processes and it is a suitable biomatrix for colonization by osteoblast-like cells. In biological assays conducted on the hydrogel hybrid material according to the invention, it was revealed that material retain its biocompatibility, as well as ability to support adhesion, proliferation and maintaining the phenotype of osteoblast-like cells (MG-63).

Herein below, examples of the invention are shown.

EXAMPLE 1. PREPARATION OF HYDROGEL HYBRID MATERIAL

Preparation of hydrogel hybrid material according to the invention comprises two substantial steps, described in detail herein below in paragraph 1 and paragraph 2.

1. Preparation of Silica Particles Functionalized with Amine Groups

Silica particles functionalized with amine groups were obtained with a sol-gel method. 1.0 ml of tetraethoxysilane (TEOS) and 0.1 mL of aminopropyltriethoxysilane (APTES) were added sequentially to a mixture composed of ethanol (5.1 mL) and water (5 mL). The resulting mixture was mixed using a magnetic stirrer for 30 minutes in room temperature. The obtained material was centrifuged and then purified by washing with ethanol and centrifuging. The ethanol wash/centrifugation cycle was repeated four times. The material was dried in vacuum chamber in 60° C. After purification, a white powder was obtained.

2. Preparation of the Hybrid Material

Hybrid material was obtained as a result of simultaneous crosslinking with genipin of a mixture of biopolymers (collagen, chitosan and hyaluronic acid) and surface modified silica particles. An appropriate volumes of biopolymer solutions were mixed: 590 µl of collagen solution (Kol) (a solution in hydrochloric acid with a concentration in range of 3.5-4.1 mg/ml—in the form as provided by the supplier BD Biosciences) with 193 µl of chitosan solution (Ch) (a solution with 1% w/w in 1% acetic acid) with 48 µl of hyaluronic acid solution (HA) (a solution with 1% w/w in 10×phosphate buffer (PBS) (with a composition of: NaCl (c=1.37 M), KCl (c=27 mM), $Na_2HPO_4$ (c=43 mM), $KH_2PO_4$ (c=14 mM), pH adjusted to 7.4 with concentrated (c=35%) hydrochloric acid HCl solution). The obtained sol was subjected to vigorous shaking and then 0.3 mL of aqueous dispersion of functionalized silica particles was added at a suitable concentration (S1=16.6 mg/mL, S2=8.3 mg/ml, S3=1.7 mg/mL). The mixture was shaken again and then 169 µl of genipin solution was added (a solution with a concentration of 20 mM, prepared in 10×PBS) and it was incubated in 37° C. until complete crosslinking. The obtained material is in a form of hydrogel. The weight ratio of biopolymers in the obtained material was: Kol:Ch:HA—50:40:10. Using three different concentrations of dispersions of silica particles, three types of hybrid materials were obtained: KolChHA S1, KolChHA S2 and KolChHA S3. As a control material, a hydrogel with an analogous biopolymer composition, but without the addition of silica particles (KolChHA) was obtained.

EXAMPLE 2. PHYSICOCHEMICAL PROPERTIES OF THE OBTAINED HYDROGEL HYBRID MATERIAL AND OF THE SUBSTRATES USED FOR ITS PREPARATION

1) Physicochemical Properties of Silica Particles Functionalized with Amine Groups FIG. 1 shows a scheme of the preparation of silica particles functionalized with amine groups.

Figure 2:
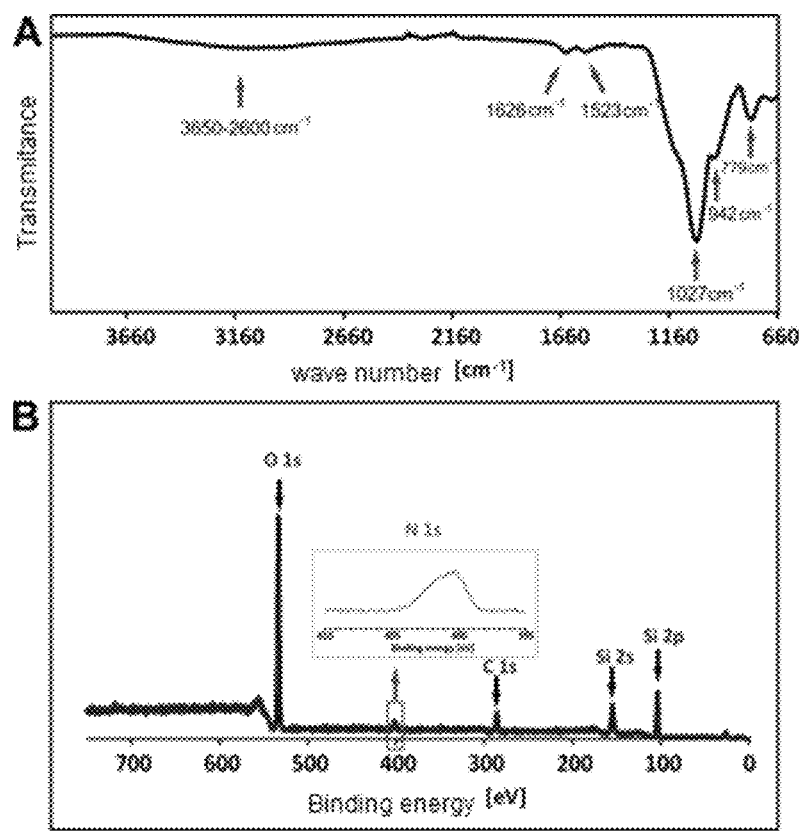

Preparation of functionalized silica particles was confirmed with spectroscopic methods, their morphology and porosimetric parameters also being determined. FIG. 2 shows a comparison of FTIR and XPS spectra obtained for the synthesized material. Bands visible in the FTIR spectrum (FIG. 2A) confirm the presence of both silanol groups and amine groups. An intense, narrow band at 1027 cm$^{-1}$ is derived from Si—O bending vibrations, while the peak at 779 cm$^{-1}$ from Si—O—Si stretching vibrations, both being characteristic of silica. The band at 942 cm$^{-1}$ can be assigned to the Si—OH group, while the peak at 1523 cm$^{-1}$ is derived from the NH$_2$-group. The band at 1626 cm$^{-1}$ can be assigned to the adsorbed H$_2$O, while the wide extensive band found in the 2600-3650 cm$^{-1}$ range is a juxtaposition of bands derived from adsorbed water particles, OH groups present on the surface of the sample and amine groups.

In order to make a more complete analysis of the surface composition of the obtained material, an analysis using photoelectron spectroscopy (XPS) was performed. FIG. 2B shows the obtained spectrum, with the peaks visible therein that can be assigned to O1s (531.1 eV), N1s (402.6 eV), C 1s (286.5 eV), Si 2s (155.1 eV) and Si 2p (103.5). The signals derived from N1s and C1s can be considered diagnostic for surface functionalization using APTES, because silica particles obtained with TEOS do not contain these elements. Surface composition analysis of the material shown in Table 1 demonstrated that SiCON structures were obtained with atomic composition of 78%, 3%, 7% and 12% for O, N, C and Si, respectively. Theoretical atomic composition was calculated while assuming the chemical structure of functionalized silica particles being resultant from the TEOS: APTES molar ratio (10:1) used in the synthesis. By comparing the experimental and theoretical data, a higher oxygen level can be observed, which may be caused by the presence of silanol groups exposed on the surface, formed as a result of partial polycondensation of the precursors employed.

FIG. 2 shows a comparison of FTIR (A) and XPS (B) spectra obtained for silica particles functionalized with amine groups

TABLE 1

XPS results for elemental surface composition (%) for silica particles functionalized with amine groups.

| Elemental surface composition (%) | O1s | N1s | C1s | Si2p |
|---|---|---|---|---|
| Experimental data | 78 | 3 | 7 | 12 |
| Theoretical data | 49 | 2 | 5 | 44 |

Additionally, hydrodynamic diameters were determined, as well as surface potentials (zeta) for the obtained particles. The gathered data were summarized in Table 2. A mean hydrodynamic diameter of the particles obtained from DLS measurements is about 607 nm, with dispersion index, DI=0.3. The zeta potential of the obtained particles was positive (35 mV) as a result of protonation of amine groups found in the APTES backbone, which is another result verifying the effective functionalization.

Figure 3:
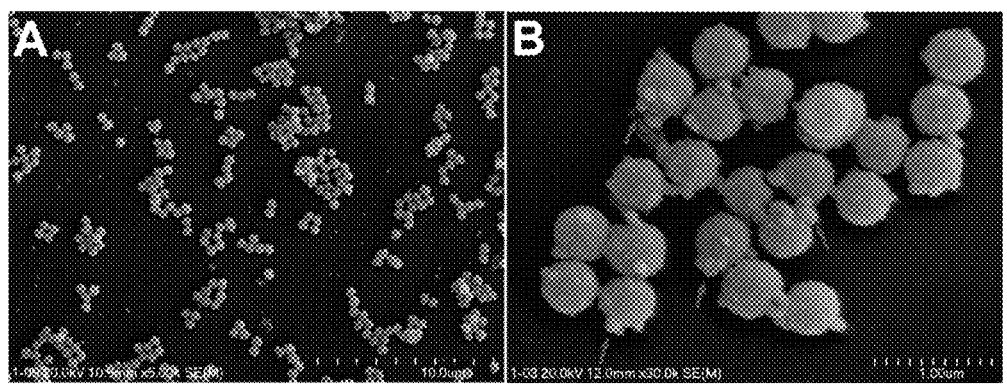

Morphology of the obtained material was determined using scanning electron microscopy (SEM). FIG. 3 shows the obtained microphotographs of the functionalized silica particles, wherein two particle populations can be seen. The larger ones have a diameter of about 400 nm while the smaller particles have diameters of about 100 nm. The smaller particles (indicated with arrows in FIG. 3B) have a tendency to aggregate around larger objects.

Based on nitrogen adsorption isotherm measurements, porosity characterizing parameters were determined for the obtained particles (Table 2). Specific surface area ($S_{BET}$) was measured based on the Brunauer-Emmett-Teller (BET) model, as well as the size and volume of the pores. It was found that the functionalized silica particles are characterized by specific surface area of 24 m$^2$/g and that they have substantial mesoporosity (0.14 cm$^3$/g).

2) Physicochemical Properties of the Hybrid Material

Figure 4:
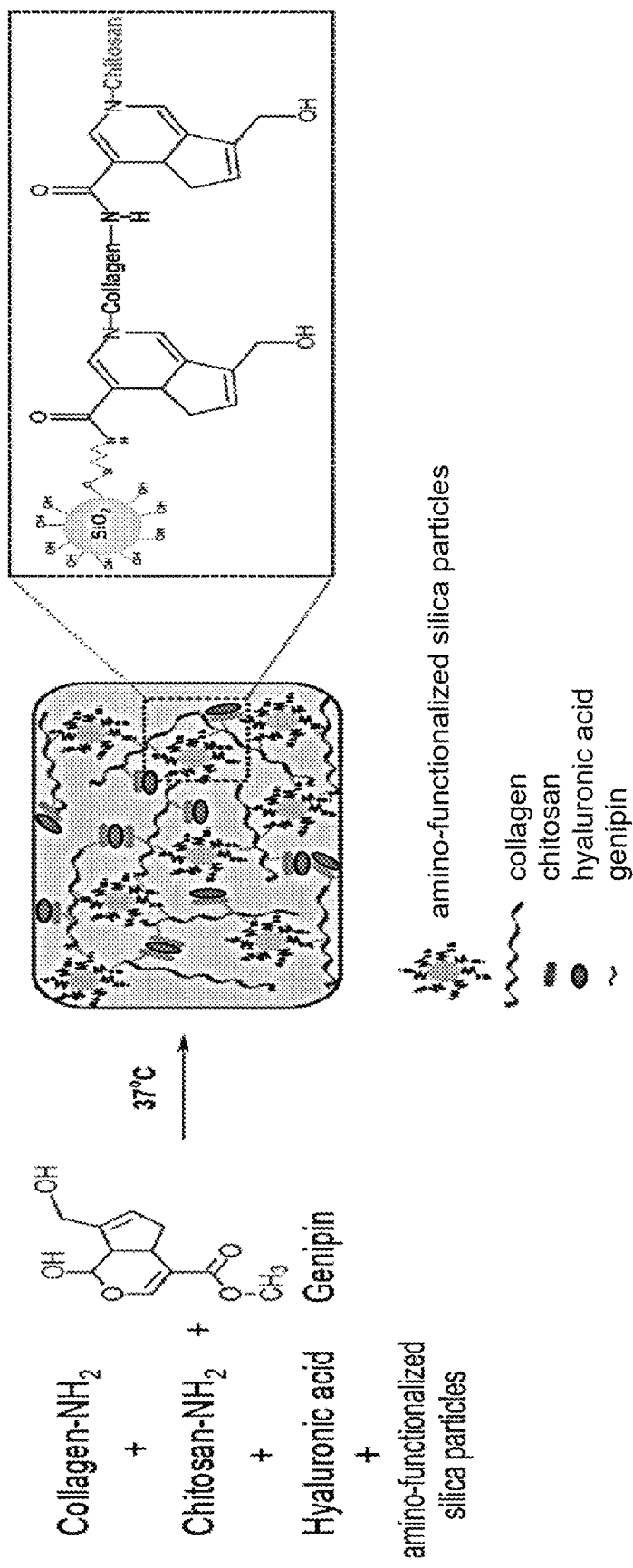

FIG. 4 shows a scheme of the preparation of the hybrid material. Using three different concentrations of the silica particles dispersion, three types of hybrid materials were obtained: KolChHA S1, KolChHA S2 and KolChHA S3 with their compositions shown in Table 3.

TABLE 3

Summary of compositions of the obtained hybrid materials (Kol-collagen, Ch-chitosan, HA-hyaluronic acid).

| Material type | Weight ratio Kol:Ch:HA | Concentration of functionalized silica particles [mg/ml] |
|---|---|---|
| KolChHA S1 | 50:40:10 | 16.6 |
| KolChHA S2 | 50:40:10 | 8.3 |
| KolChHA S3 | 50:40:10 | 1.7 |

Microstructure of the obtained hybrid systems was characterized using SEM. Analysis of the obtained microphotographs (FIG. 5) shows the presence of silica particles in each of the prepared systems.

Figure 5:
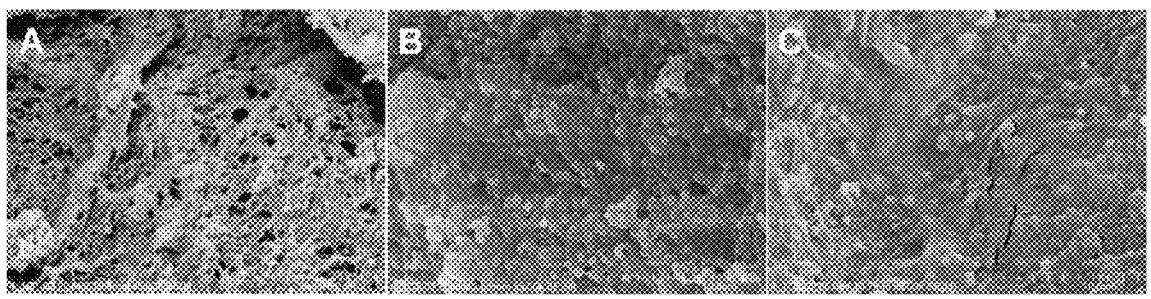

FIG. 5 shows SEM microphotographs obtained for the resulting hybrid materials, the KolChHA S1 material (A), the KolChHA S2 material (B) and the KolChHA S3 material (C).

The surface wettability of the obtained materials was tested based on the results of contact angle measurements. The obtained results are summarized in Table 4. Analysis of the collected data indicates that the addition of functionalized silica particles to the polymer matrix causes the surface of the materials to become more hydrophilic, as demonstrated by the lower values of contact angle compared to the material without silica particles (KolChHA). The material having the highest level of silica particles (KolChHA S1) is characterized by the most hydrophilic surface. Surfaces of the materials with lower concentration of silica particles (KolChHA S2 and KolChHA S3) show a similar degree of wettability. Enhanced hydrophilicity can be explained by the

TABLE 2

Summary of data obtained for functionalized silica particles: hydrodynamic diameter (dz), dispersion index (DI), zeta potential (ζ), as well as porosimetric parameters, including: specific surface area (SBET), volume (Vmes) and diameter (Dmes) of mesopores.

| $d_z$ [nm] | DI | ζ [mV] | $S_{BET}$ [m$_2$/g] | $V_{mes}$ (BJH) [cm$_3$/g] | $D_{mes}$ (BJH) [nm] |
|---|---|---|---|---|---|
| 607 ± 23 | 0.3 | 35 ± 1 | 24 | 0.14 | 23 | presence of hybrid functionalized silica particles on the surface of hybrid materials, having surface-exposed hydrophilic amine groups (as confirmed by the XPS analysis).

TABLE 4

Contact angle values for the obtained materials.

| Material type | Contact angle value [°] |
|---|---|
| KolChHA | 87.2 ± 2.5 |
| KolChHA S1 | 68.6 ± 1.6 |
| KolChHA S2 | 76.9 ± 2.4 |
| KolChHA S3 | 76.5 ± 1.7 |

Swelling degree (SD) was also determined for the obtained hybrid materials. The experiment was conducted in physiological conditions (pH=7.4; temperature=37° C.), with the results shown on FIG. 6. It can be seen that the concentration of functionalized silica particles has a significant impact on swelling characteristics of the studied materials-SP decreasing with their levels rising. In the case of material with the highest concentration of particles (KolChHA S1), the swelling degree is substantially lower in comparison with the control material (KolChHA). This result indicates that silica particles have an effect on rigidity of the hydrogel structure. Furthermore, the functionalization of silica particles allowing covalent linking to a polymer network contributes to the increase of network density in hybrid materials and thereby causes a decrease in SD. In case of the KolChHA S2 and KolChHA S3 materials, a significant change in swelling characteristic was not observed in comparison with the KolChHA hydrogel.

Figure 6:
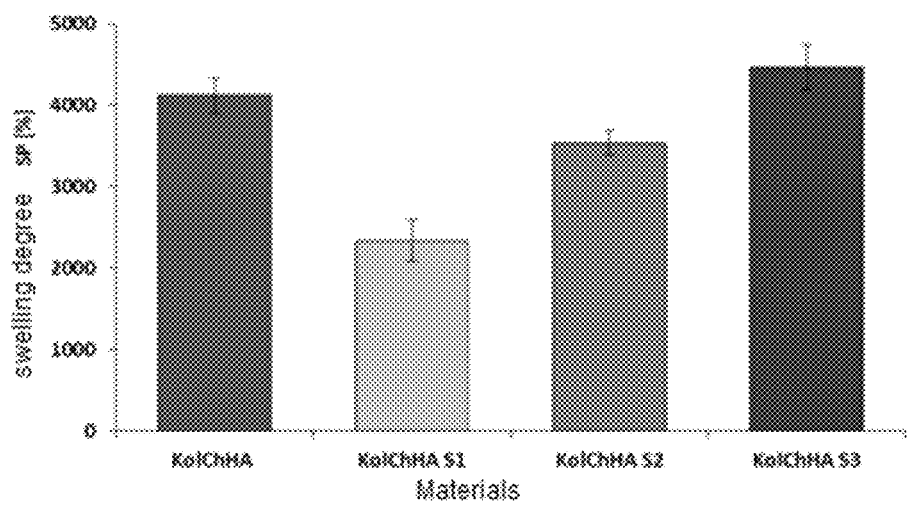

FIG. 6 shows the swelling degree in physiological conditions for the obtained materials.

EXAMPLE 3. CONTROLLED GELLING OF THE SOL OBTAINED FROM BIOPOLYMER MIXTURE AND SURFACE-FUNCTIONALIZED SILICA PARTICLES

Figure 8:
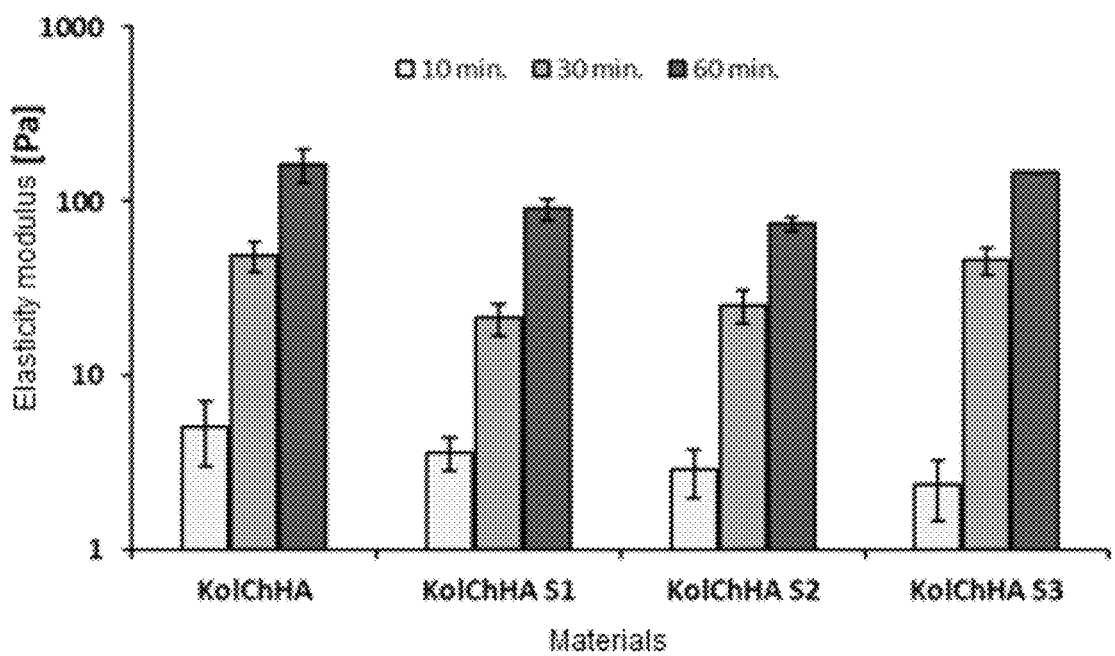

In order to confirm the possibility of employing the developed hybrid systems as injectable materials, rheological measurements were made, that by tracking the changes in elasticity modulus (G') in time enabled verification of sol to gel phase transition. G' values measured after 10, 30 and 60 minutes of the experiment are shown on FIG. 8 (the experiment being conducted at 37° C., after the addition of genipin solution to the sol, as described above). At the beginning of the gelling process (after 10 minutes), G' values for all materials are at low levels (in the range of 2-5 Pa) confirming their viscoelastic condition and injectable form. G' values increase substantially after 30 minutes and achieve maximum values within 60 minutes from the initiation of the crosslinking process (gel formation). Hence, the comparison of the G' values at the beginning (sol) and at the end (gel) of the rheological experiment, demonstrates that the developed materials can serve as injectable materials. At the same time it may be concluded that the presence of functionalized silica particles with surface groups which enable their incorporation through crosslinking into the hydrogel structure, does not hinder the process of gel formation. The obtained data revealed an injectability potential of the developed hybrid materials which is particularly significant due to the ease of their implantation in the potential tissue engineering applications.

EXAMPLE 4. BIOACTIVE PROPERTIES OF THE OBTAINED HYBRID MATERIALS

Figure 9:
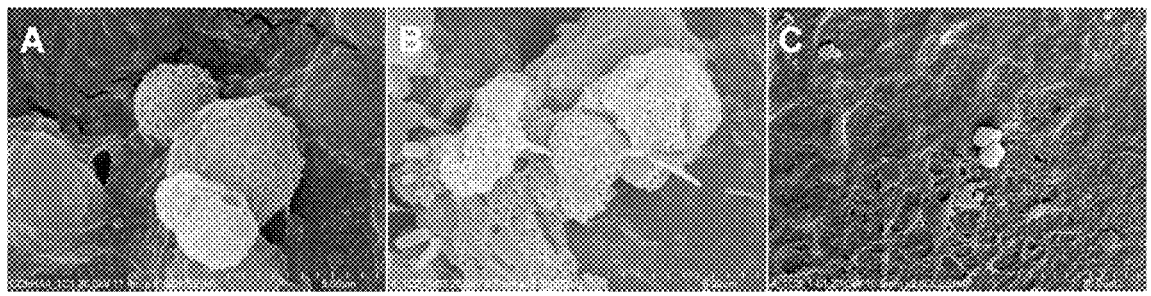

Considering the potential applications of the obtained hybrid materials as scaffolds in bone tissue engineering, their bioactive characteristics were studied. For this purpose, an in vitro biomineralization experiment was conducted in the simulated body fluid (SBF) conditions. Literature data indicate that materials capable of forming an apatite layer on their surface in SBF will also undergo biomineralization in a living body thus providing the effective integration of the scaffold with the natural bone. An ability of the developed materials to initiate apatite nucleation process was studied in an experiment involving their 7-day incubation in SBF in 37° C. Next, the materials were analysed using two techniques: SEM and EDS. FIG. 9 shows the obtained SEM microphotographs and Table 5 summarizes the calcium to phosphorous ratios (Ca/P) as determined by EDS for the mineral phase formed on the surface of the materials.

TABLE 5

Ca/P ratio as determined by EDS for the mineral phase formed on the surface of the materials after 7-day incubation in SBF.

| Material type | Ca/P ratio |
|---|---|
| KolChHA | — |
| KolChHA S1 | 1.29 ± 0.03 |
| KolChHA S2 | 1.29 ± 0.08 |
| ColChHA S3 | — |

The obtained results clearly suggest that the functionalized silica particles render the obtained hybrid materials KolChHA S1 and KolChHA S2 bioactive. Only in the case of these materials biomineralization can be observed, evidenced by the formation of a new mineral phase with a structure and Ca/P ratio typical for apatite. For the control material (KolChHA), as well as the hybrid material with the lowest concentration of particles (KolChHA S3) biomineralization does not occur. Thus, it can be concluded that the KolChHA S1 and KolChHA S2 hybrid materials have bioactive properties.

EXAMPLE 5. BIOLOGICAL PROPERTIES OF THE OBTAINED HYBRID MATERIALS

Biological properties of the obtained hybrid materials were also investigated, including their biocompatibility, ability to support adhesion, proliferation and alkaline phosphatase (ALP) activity for osteoblast-like cells MG-63 cultured on the surface of the materials.

Figure 10:
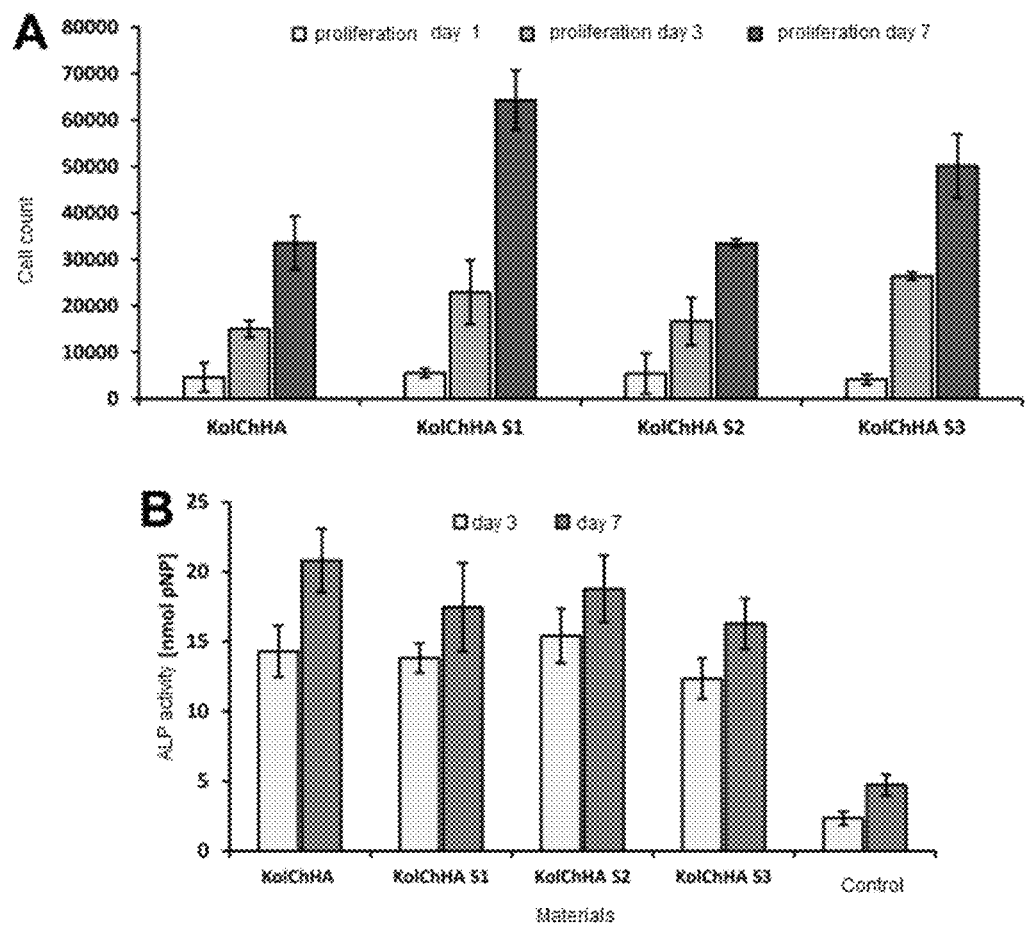

FIG. 10 shows MG-63 cells proliferation after 1, 3 and 7 days of culture on the surface of the tested materials (A), and alkaline phosphatase (ALP) activity for the MG-63 cells after 3 and 7 days of culture on the surface of the tested materials.

Results of cell viability tests (the Almar Blue assay) conducted after 1, 3 and 7 days of culture (FIG. 10A) demonstrated that the presence of functionalized silica particles permanently associated with the polymer network does not deteriorate the biocompatibility of the hybrid materials, nor their ability to support MG-63 cells proliferation in comparison to the control material KolChHA.

Alkaline phosphatase (ALP) is a bone formation protein being a marker for early stages of osteoblast differentiation. Due to the physiological function of ALP it also plays the role of a phenotype conformation and osteoblast mineralization marker. ALP activity in the MG-63 cells cultured on the studied materials was determined on day 3 and 7 of culture, with the results shown in FIG. 10B. In the case of all the hybrid materials, as well as the control material, a similar trend was observed for an increase in activity after 7 days of the experiment. Moreover, ALP levels both on day 3 and 7 of culture were significantly higher in comparison with ALP activity of cells on a culture plate.

Figure 11:
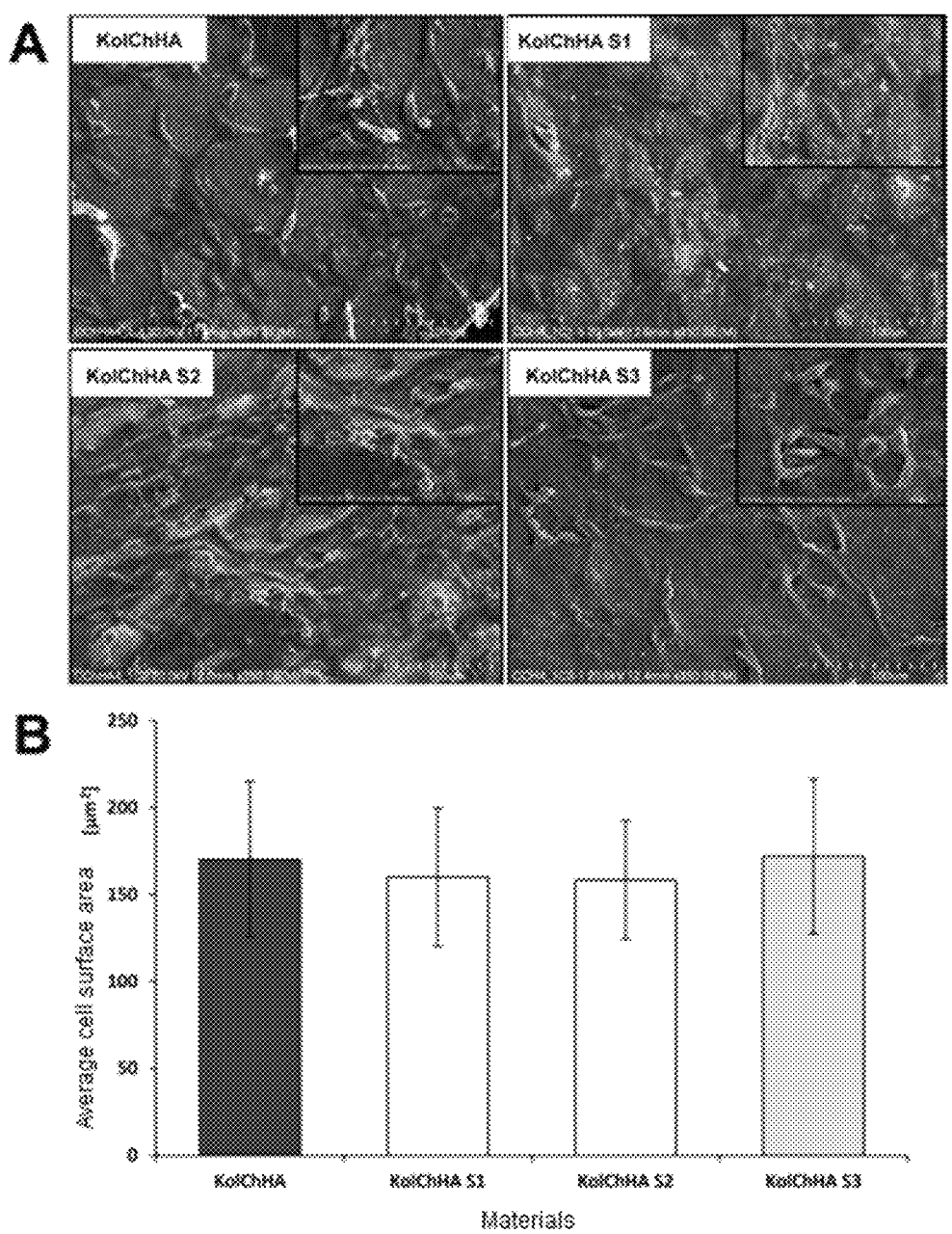

MG-63 cell morphology and adhesion were also studied after 3 days of culture on the surface of the materials. For this purpose, the cells were fixed and evaluated using the SEM technique. FIG. 11 shows SEM microphotographs (FIG. 11A) demonstrating morphology of fixed cells, as well as a graph showing their average surface area (estimated based on SEM microphotographs). Based on microphotography analysis it can be observed that the cells adhere well both to the surface of the hybrid materials and to the control hydrogel. On all tested surfaces, the cells have elongated shapes which may indicate a compact and well crosslinked structure of the studied materials. The estimated average surface area for the cells has similar values for all the materials which qualitatively confirms that cell morphology on the studied materials is similar. Therefore these data proves that the presence of functionalized silica particles does not have a detrimental effect on cell adhesion.

EXAMPLE 6. ENZYMATIC DEGRADATION OF THE HYBRID MATERIAL

Figure 7:
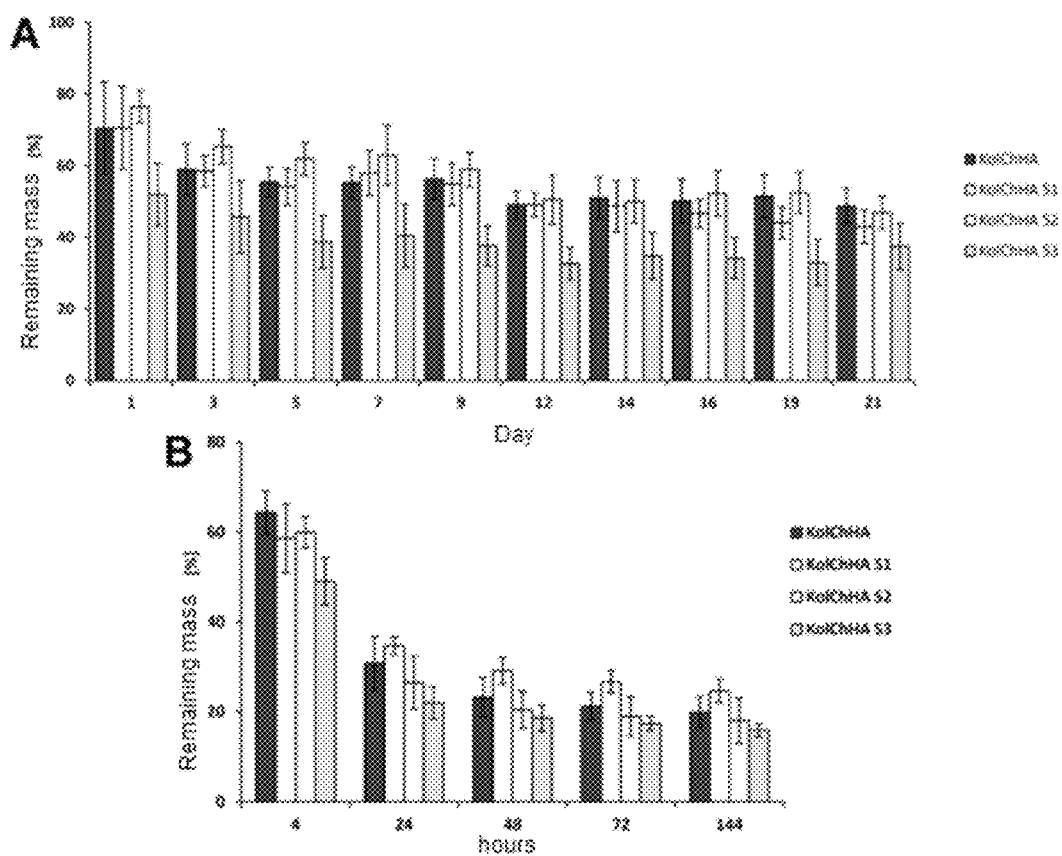

The process of degradation was studied in PBS as well as in the presence of an enzyme—a collagenase. FIG. 7 shows changes in the mass of the materials during incubation in PBS buffer (FIG. 7A) and in the presence of collagenase (FIG. 7B). The largest loss in mass occurs after the first day of degradation and involves all of the studied materials. In the following days only slight mass variations are observed. In the case of hybrid materials KolChHA S1 and KolChHA S2, the course of the degradation process throughout the experiment is similar to the degradation for the control material KolChHA (the changes are not statistically significant). This suggests that the presence of functionalized silica particles at the highest (1) and medium (2) concentrations does not impact the rate of loss in hydrogel mass. The lack of significant differences in the loss in mass additionally confirms the effectiveness of incorporation of the functionalized silica particles into the polymer network, because otherwise 'leaking' of silica from the hydrogel network should manifest in a larger loss in mass for the obtained hybrid systems. The material with the lowest concentration of silica particles (KolChHA S3) for almost the whole time throughout the experiment shows a relatively larger loss in mass when compared to the other studied materials. After finishing the experiment (after 21 days) the values for the remaining mass for all the materials are similar, with the degree of sample degradation of 37 to 48%.

Enzymatic degradation was studied for 144 hours, in FIG. 7B the obtained results are depicted. After 4 hours of enzymatic degradation, the loss in mass was about 35-50%. The next significant change occurred after 24 hours when the materials lost about 65-80% of their initial mass. Extending incubation of the materials with collagenase to 144 hours did not cause additional significant changes in their mass. The analysis of the loss in mass for all of the studied materials at a given measuring point shows a lower degree of degradation for the material with the highest concentration of silica particles (KolChHA S3). Similarly to the degradation in PBS, slight variations in the course of enzymatic degradation between the control material (KolChHA) and the hybrid materials may indicate effective immobilization of functionalized silica particles within the hydrogel structure.

CONCLUSIONS

Based on conducted tests, the following unexpected advantages of the obtained hybrid material can be found:

a) Structural stability of the hybrid materials with a simultaneous retaining of an injectable form of biopolymer sol. The conducted physicochemical studies (swelling degree, wettability, degradation) demonstrated the effectiveness of incorporation of the functionalized silica particles into the biopolymer network. A hybrid material was obtained for the first time wherein silica particles have been permanently linked to a biopolymer network matrix, which substantially improves the characteristics of the system, in particular eliminating the problem of potential phase separation of the particles and their uncontrolled diffusion to tissues in vivo. Rheological studies confirmed that the developed hybrid materials may be prepared in the form of a sol and after addition of a crosslinking agent, genipin and incubation at 37° C. transformed into gel which corresponds to the possibility of their use in an injectable form in physiological conditions. This fact is of a great importance when regarding application potential of the obtained hybrid materials. The developed hybrid materials may serve as injectable scaffolds which after being introduced to a defect site in tissue in the form of viscous sol would undergo gelling in situ in physiological conditions with a rate controlled by the composition, in particular by the amount of the genipin added.

b) Bioactivity of the hybrid materials. The tests performed in conditions simulating human plasma (SBF, Simulated Body Fluid) confirmed bioactivity of the hybrid materials: the KolChHA S1 and KolChHA S2 systems. Based on literature data bioactive properties can be expected for materials comprising silica particles having silanol groups Si—OH on their surface [(1) J. Lewandowska-Łańcucka, K. Mystek, A. Mignon, S. Van Vlierberghe, A. Łatkiewicz, M. Nowakowska, *Alginate- and gelatin-based bioactive photo-cross-linkable hybrid materials for bone tissue engineering*, Carbohydrate polymers, (2017), 157, 1714-1722; (2) K. Li, H. Sun, H. Sui, Y. Zhang, H. Liang, X. Wu, Q. Zhao, *Composite mesoporous silica nanoparticle/chitosan nanofibers for bone tissue engineering*, RSC Adv. 5 (23) (2015) 17541-17549; (3) L. Keller, A. Regiel-Futyra, M. Gimeno, S. Eap, G. Mendoza, V. Andreu, Q. Wagner, A. Kyzioł, V. Sebastian, G. Stochel, M. Arruebo and N. Benkirane-Jessel, *Chitosan-based nanocomposites for the repair of bone defects*, Nanomedicine 13 (7) (2017) 2231-2240]. It is therefore not obvious that such properties would be found in hybrid materials wherein silica particles functionalized with amine groups were introduced. Moreover, it was a concern whether replacing silanol groups with amine groups would not limit bioactivity of silica particles.

c) A substantial increase in biomineralization process was observed (up to 7 days) in comparison to the previously shown research wherein unmodified silica particles were used at analogous concentration. In publications ((1) J. Lewandowska-Łańcucka, S. Fiejdasz, Ł. Rodzik, M. Kozieł, M. Nowakowska, *Bioactive hydrogel-nanosilica hybrid materials: a potential injectable scaffold for bone tissue engineering*, Biomedical Materials, (2015), 10 (1), 015020; (2) J. Lewandowska-Łańcucka, S. Fiejdasz, Ł. Rodzik, A. Łatkiewicz, M. Nowakowska, *Novel hybrid materials for*

*preparation of bone tissue engineering scaffolds*, Journal of Materials Science: Materials in Medicine, (2015), 26 (9), 231), mineral phase formation was observed only after 21 days of incubation in SBF.

d) Retaining biocompatibility as well as ability to promote adhesion, proliferation and maintaining of phenotype for osteoblast-like cells (MG-63). The conducted biological in vitro studies showed that the presence of functionalized silica particles permanently linked to the polymer network does not deteriorate biocompatibility of hybrid materials (in comparison with the control material KolChHA) nor ability to support adhesion, proliferation and also maintaining the phenotype of osteoblast-like cells (MG-63).

REFERENCES

1. R. Mishra, T. Bishop, I. L. Valerio, J. P. Fisher, D. Dean, The potential impact of bone tissue engineering in the clinic, Regen. Med. 11 (6) (2016) 571-587.
2. M. Liu, X. Zeng, Ch. Ma, H. Yi, Z. Ali, X. Mou, S. Li, Y. Deng, N. He, Injectable hydrogels for cartilage and bone tissue engineering, Bone Res. 5 (2017) 17014.
3. J. Nourmohammadi, F. Roshanfar, M. Farokhi, M. H. Nazarpak, Silk fibroin/kappa-carrageenan composite scaffolds with enhanced biomimetic mineralization for bone regeneration applications, Mater. Sci. Eng. C. 76 (2017) 951-958.
4. H. Tan, K. G. Marra, Injectable, biodegradable hydrogels for tissue engineering applications, Materials 3 (3) (2010) 1746-1767.
5. K. Y. Lee, D. J. Mooney, Hydrogels for tissue engineering, Chem. Rev. 101 (7) (2001) 1869-1879.

The invention claimed is:

1. A method of preparation of an injectable bioactive hydrogel hybrid material having the ability to initiate an apatite nucleation process comprising the following steps:
    a) functionalizing silica particles with amine groups using a sol-gel method by combining tetraethoxysilane and aminopropyltriethoxysilane at a molar ratio of 10:1,
    b) dispersing the silica particles functionalized with amine groups obtained in step a) in a mixture of solutions of collagen, chitosan and hyaluronic acid having a weight ratio of 50:40:10 (collagen: chitosan: hyaluronic acid) to prepare a dispersion, and
    c) covalently crosslinking the dispersion obtained in step b) with genipin to obtain the injectable bioactive hydrogel hybrid material, wherein the content of the functionalized silica particles in the injectable bioactive hydrogel hybrid material is no less than 1.9 mg/mL.

2. The method according to claim 1, wherein step a) comprises preparing silica particles functionalized with amine groups by reacting tetraethoxysilane with aminopropyltriethoxysilane in the presence of water and ethanol.

3. The method according to claim 1, wherein step b) further comprises preparing the mixture of solutions by mixing:
    from 12 to 13 volumes of a collagen solution in hydrochloric acid in a concentration of collagen in the range of 3.5 to 4.1 mg/mL,
    about 4 volumes of a chitosan solution in a concentration of 1% w/w in 1% acetic acid,
    about 1 volume of a hyaluronic acid solution in a concentration of 1% w/w in 10× phosphate buffer PBS.

4. The method according to claim 1, wherein step b) comprises dispersing an aqueous suspension of silica particles functionalized with amine groups in the mixture of solutions in an amount providing a concentration of functionalized silica particles in the injectable bioactive hydrogel hybrid material of 1.9 to 3.8 mg/mL.

5. The method according to claim 1, wherein step c) comprises mixing the dispersion obtained in step b) with a genipin in an amount providing a concentration of genipin of no less than 0.6 mg/mL.

6. The method according to claim 2, further comprising separating, washing, and drying the silica particles functionalized with amine groups to provide a colorless powder.

* * * * *